United States Patent [19]

Fohl et al.

[11] 4,347,053

[45] Aug. 31, 1982

[54] PHOTOGRAPHIC FLASH DEVICE USING LIGHT-EMITTING PYROTECHNIC CHARGES

[75] Inventors: Timothy Fohl, Carlisle; Andre C. Bouchard, Peabody, both of Mass.

[73] Assignee: GTE Products Corporation, Stamford, Conn.

[21] Appl. No.: 146,578

[22] Filed: May 5, 1980

[51] Int. Cl.³ .............................................. F21K 5/00
[52] U.S. Cl. .................................. 431/359; 431/360; 431/362; 431/365
[58] Field of Search ............... 431/357, 360, 358, 365, 431/359, 362; 362/11, 14, 15

[56] References Cited

U.S. PATENT DOCUMENTS

| 4,059,388 | 11/1977 | Shaffer | 431/362 |
| 4,098,565 | 7/1978 | Van de Weijer | 431/359 |
| 4,158,878 | 6/1979 | Morris et al. | 431/360 X |

*Primary Examiner*—Edward G. Favors
*Attorney, Agent, or Firm*—Lawrence R. Fraley

[57] ABSTRACT

A photographic flash device which includes several pyrotechnic charges for emitting light upon electrical ignition thereof. Each charge is centrally suspended within an individual chamber located within the device's light-transmitting, plastic housing. The charges may be arranged in annular or linear arrays.

19 Claims, 7 Drawing Figures

PHOTOGRAPHIC FLASH DEVICE USING LIGHT-EMITTING PYROTECHNIC CHARGES

DESCRIPTION

1. Technical Field

The present invention relates to flash devices for use in the field of photography and particularly to such devices which are electrically activated and adapted for being used within or atop a camera. Even more particularly, the invention relates to such devices which utilize pyrotechnic charges as the desired light sources.

2. Background

The instant invention represents to a new and unique concept in the production of flash devices for photographic purposes. As will be defined, the flash device of the instant invention provides for the incorporation of several relatively high intensity light sources within a miniaturized, compact design particularly adapatable for use with many of today's cameras with only minor modification thereto. As will be further defined, the invention is of rigid construction and is both easy and safe to operate within cameras accepting the invention. It will be understood from the following that the invention may be manufactured with greater ease and less cost than many known flash devices which typically require chemical flashlamps as the designated light sources. By the term chemical flashlamp is meant one having a glass envelope, a combustible material (typically zirconium shreds) within the envelope, a suitable ignition means projecting through the walls of the glass envelope and including a primer material which is adapted for igniting the shreds upon application of adequate ignition voltage across the ignition wires. This voltage is typically provided from the source located within the camera, said source in many of today's cameras comprising a piezoelectric element.

It is believed, therefore, that a flash device possessing the aforedefined several features constitutes an advancement in the art.

DISCLOSURE OF THE INVENTION

It is a primary object of the present invention to provide a new and unique photographic flash device which possesses the features described above.

It is another object of the present invention to provide a new, improved method for assuring optimum light output from a pyrotechnic charge oriented within a light-transmitting housing.

In accordance with one aspect of the invention, there is defined a photographic flash device which comprises a light-transmitting housing having a plurality of individual chambers and a common expansion cavity therein, a plurality of pyrotechnic charges each located within a respective one of the housing's chambers for emitting light through the housing upon ignition thereof, and a plurality of electrical ignition means each connected to a respective one of the pyrotechnic charges for permitting said charges to be individually flashed.

In accordance with another aspect of the invention, there is provided an improved photographic flash device having a light-transmitting housing with at least one chamber located therein having at least one pyrotechnic charge located within the chamber to emit light through the housing upon ignition thereof. The improvement comprises suspending the pyrotechnic charge within the chamber in order that the charge will be centrally oriented therein and spaced a predetermined distance from the internal surfaces of the walls of the chamber.

BEST MODE FOR CARRYING OUT THE INVENTION

For a better understanding of the present invention, together with other and further objects, advantages, and capabilities thereof, reference is made to the following disclosure and appended claims in connection with the above-described drawings.

Figure 1:
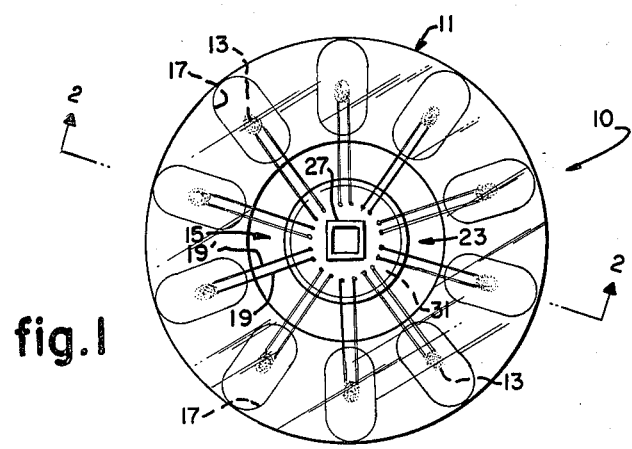
FIG. 1 is a plan view of a photographic flash device using light-emitting pyrotechnic charges in accordance with a preferred embodiment of the invention.
Figure 2:
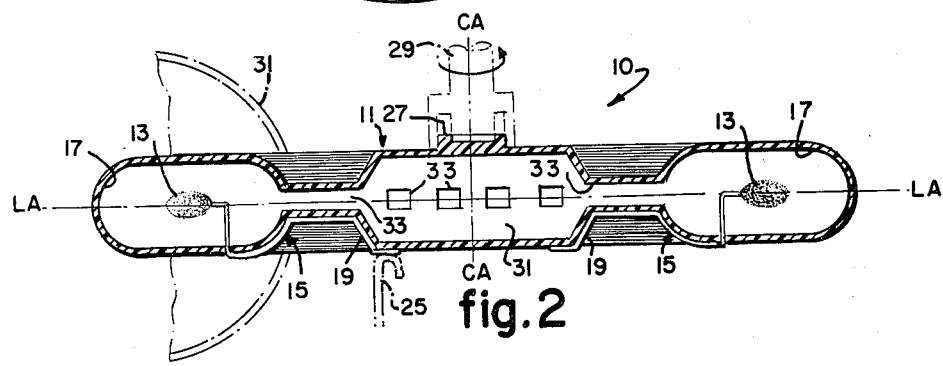
FIG. 2 is an enlarged side elevational view, in section, of the flash device of FIG. 1 as taken along the line 2—2 in FIG. 1.
Figure 3:
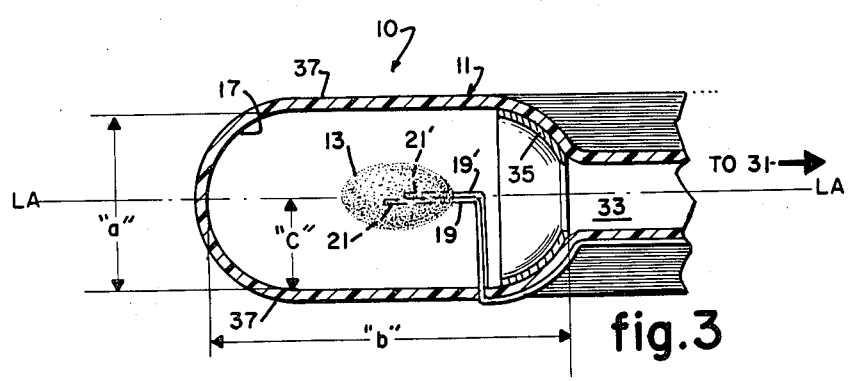
FIG. 3 is an enlarged, side elevational view of one of the chambers of the device of FIGS. 1 and 2 illustrating the preferred means for suspending the device's pyrotechnic charge therein.

With particular reference to FIGS. 1 and 2, there is shown a photographic flash device 10 which includes a light-transmitting, insulative housing 11, a plurality (e.g., ten) of pyrotechnic charges 13 located within housing 11 for providing the desired light output for device 10, and a corresponding plurality of electrical ignition means 15 for permitting individual flashing of charges 13 when device 10 is located within a camera (not shown). Housing 11 is of insulative material (e.g., plastic) and includes a plurality of individual chambers 17 each adapted for accommodating a respective one of the charges 13. Each chamber 17 is preferably of elongated configuration and therefore includes a longitudinal axis LA—LA (FIG. 3). As illustrated in FIGS. 1 and 2, housing 11 is of a substantially cylindrical configuration with the chambers 17 oriented in an annular array about the peripheral, outer portions of the housing. It is understood that these outer portions are of course light-transmitting to permit passage of light as emitted by the respective charges 13 therethrough.

The preferred ignition means for each charge 13 comprises a pair of spaced-apart electrically conductive wires 19 and 19' each having a first end portion (21 and 21', respectively) which projects within the respective chamber 17 and includes the charge material thereon. Wires 19 and 19' pass externally from each chamber 17 to a central terminal region 23 wherein the opposing end portions of each wiere terminate. These ends are in turn arranged in an annular array such that each pair of ends are adapted for being operatively connected to the power source associated with the camera within which device 10 is located. One example of camera contacts (only one being shown) for effecting this connection is illustrated in phantom in FIG. 2 as numeral 25. As further shown in FIG. 2, housing 11 preferably includes an upstanding, rectangular-shaped boss 27 which in turn is adapted for being engaged by a suitable rotational component 29 (phantom) of the camera to provide rotational movement of device 10 within the camera such that each chamber is sequentially oriented within the camera's fixed reflector 31 (also shown in phantom). At this location, electrical contact is thus achieved between the camera's power source and the individual charge to be ignited such that the camera operator can achieve ignition by simply depressing the camera's shutter release button. The aforedefined relatively simple manner of operation thus renders the invention readily adaptable for use within practically any camera possessing the components described. It is also understood that in view of this simplistic manner of operation and design, device 10 is readily adaptable for use within many of today's existing cameras with minor modification thereto. One example of such a modification could comprise an adapter or similar unit which could be readily attached to the selected camera.

Housing 11 further includes a common expansion chamber 31 to which each of the chambers 17 has individual access. The function of cavity 31 is to accept the expansion gases emitted by charges 13 upon ignition thereof to thereby allow the high temperature gases emitted by the charges to dissipate and cool. Although cavity 31 is illustrated in the drawings as being open, it may also be filled with a porous material such as foam or fiberglass in order to further dampen any noise or stop any hot particles which may emit from charges 13. The volume of cavity 31 is larger than that of each chamber with the ratio of volumes of each chamber so that of the cavity within a range of about 1:2 to about 1:10, depending on the amount of charge material used. This ratio assures proper exhaust and expansion for the number of chambers illustrated without an adverse effect on the structural integrity of the unit. As illustrated in FIGS. 2 and 3, each chamber 17 has access to cavity 31 through an exhaust opening 33 located between the chamber and cavity. By way of specific example, the expansion cavity 31 of the device shown in FIGS. 1 and 2 had a volume of 2.00 cubic cm. while each chamber 17 possessed an internal volume of 0.33 cubic cm.

In the embodiment of FIGS. 1-3, cavity 31 is also of substantially cylindrical configuration and is oriented within housing 11 such that each of the individual chambers 17 surround the cavity. Understandably, this represents only one positioning relationship for the invention, with alternative examples (e.g., see below) readily possible. Being oriented in the configuration depicted in FIGS. 1 and 2, the central (rotational) axis CA—CA of housing 11 is coincidental to the central axis of the cylindrical cavity 31. Accordingly, the longitudinal axes of the respective chambers 13 occupy a single plane which in turn is perpendicular to the aforedefined central axes.

With particular regard to FIG. 3, there is illustrated an enlarged view of one of the preferred combustion chambers 17 for device 10. Chamber 17 is understandably positioned within the light-transmitting, peripheral portion of housing 11 such that the light emitted from the charge 13 will pass therethrough in the manner desired. To enhance emission, a reflective coating (e.g., vapor-deposited aluminum) is appled to the internal surface of chamber 17 in the portion of the chamber having exhaust opening 33 therein. Accordingly, light impinging on coating 35 from charge 13 will be reflected toward the remaining, light-transmitting portions of the housing. Coating 35 thus serves to substantially reduce light loss through the rear portion of the chamber. Understandably, this coating could also be located on an external surface (e.g., opposite the internal surface illustrated) of housing 11. When device 10 is used in conjunction with many of today's higher speed films (e.g., ASA 400), the internal reflector 35 eliminates the need for an external, fixed reflector of the type depicted in FIG. 2. This added feature thus serves to even further reduce the cost of manufacture or modification to cameras in which use of the instant invention is desired.

The embodiment of FIG. 3 also represents a new and unique method for positioning and igniting a pyrotechnic charge within a flash device for purposes of providing enhanced light output from the charge upon ignition thereof. As illustrated, charge 13 is suspended within chamber 17 on the spaced-apart ends 21 and 21' of the ignition wires 19 and 19', respectively, such that the charge is centrally oriented within the chamber and at an established distance from the internal surfaces of the housing's walls. More specifically, charge 13 is located on the chamber's longitudinal axis LA—LA and therefore in line with the internal reflector 35 and exhaust opening 33. This unique arrangement has proven to provide increased light output over designs wherein the charge was located against one of the housing's side or end walls. It is believed that this occurs because the free standing geometry substantially reduces the heat-sinking effect as would be provided by the housing's walls. In addition, the material if placed on an internal wall would in effect serve as an attenuating agent during the initial stages of the buring cycle. Still further, the burning of charge 13, as defined by the teachings of the invention, is substantially localized to maximize the coupling efficiency with the device's reflector.

In one embodiment of the invention, each chamber 17 possessed a width (dimension "a") of about 0.33 cm. and a length (dimension "b") of about 1.00 cm. Accordingly, longitudinal axis LA—LA, which passes through the center of charge 13, is located at a distance (dimension "c") of about 0.167 cm. from the interior surface of each of the longitudinal side walls 37 which define chamber 17. The walls of housing 11 possessed a thickness of about 0.08 cm.

Figure 4:
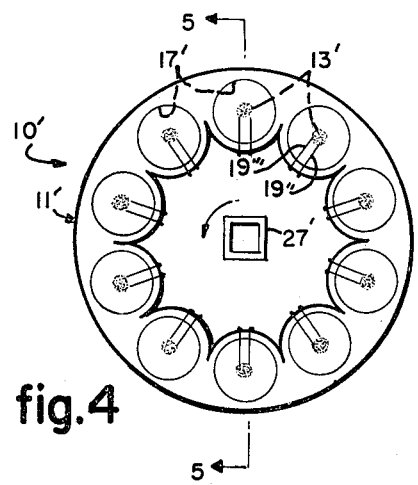
FIG. 4 is a plan view of a photographic flash device in accordance with an alternate embodiment of the invention.
Figure 5:
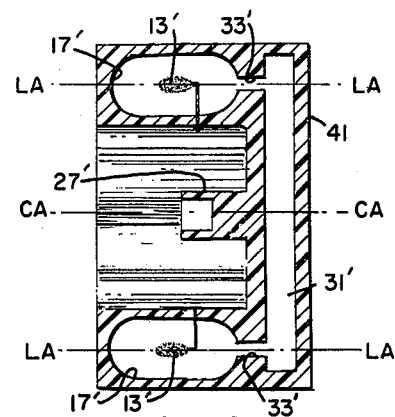
FIG. 5 is a side elevational view of the device of FIG. 4 as taken along the line 5—5 in FIG. 4.

With particular reference to FIGS. 4 and 5, there is shown a photographic flash device 10' in accordance with an alternate embodiment of the invention. Device 10', like that of device 10 in FIG. 1, comprises a cylindrical plastic housing 11' having an annular array of combustion chambers 17' therein. Within each chamber is a light-emitting pyrotechnic charge 13' which is centrally suspended within the chamber by a pair of electrical wires 19" and 19"' which project through the side walls of the plastic housing 11'. The opposing ends of each pair of wires exit the side walls and are adapted for effecting contact with the respective contacts located within the camera body or adapter. As such, these projecting pairs of wire ends form an annular array ideally suited for providing the aforementioned contact during rotation of housing 11' within the respective camera or adapter. Housing 11' includes a boss 27' similar to that of device 10 and is adapted for rotating about its central axis CA—CA as indicated by the directional arrow in FIG. 4. In the embodiment of FIGS. 4 and 5, the longitudinal combustion chambers 17' are arranged within the described annular array such that the longitudinal axes thereof are parallel to the housing's central axis. This unique positioning relationship permits positioning of the expansion (or plenum) chamber, which in turn is of cylindrical configuration, adjacent one of the end surfaces 41 of the cylindrical housing. As in the manner of operation for device 10, each combustion chamber 17' has access to the expansion chamber 31' through an exhaust opening 33' located at one of the ends of the longitudinal chamber. It is also illustrated in FIG. 5 that the central (rotational) axis of the housing is coincidental to that of the cylindrical plenum chamber 31'.

Figure 6:
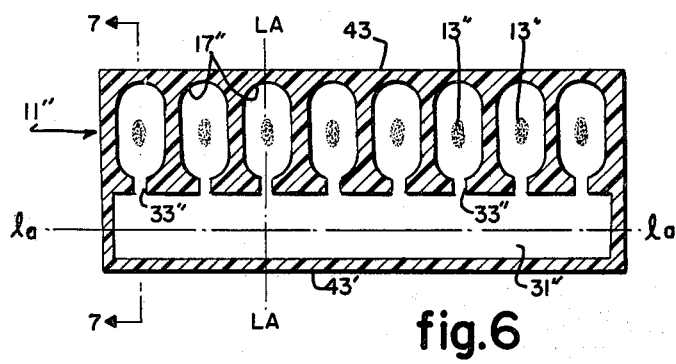
FIG. 6 is a plan view of a photographic flash device in accordance with yet another embodiment of the invention.
Figure 7:
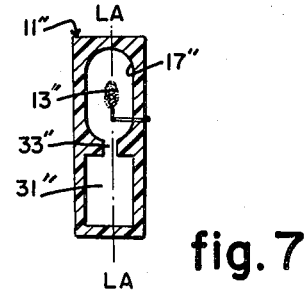
FIG. 7 is a side elevational view of the device of FIG. 6 as taken along the line 7—7 in FIG. 6.

In the embodiment of FIGS. 6 and 7, housing 11'' is of a box-like configuration having longitudinal top and bottom surfaces 43 and 43'. The longitudinal combustion chambers 17'' are arranged within housing 11'' in a linear array and each have access to the longitudinal expansion cavity 31'' which lies adjacent one of the longitudinal sides 43' of the housing. As in the above embodiments, the portion of the plastic housing which encapsulates or defines each of the expansion chambers is transparent or light-transmitting to permit passage of light emitted from each of the pyrotechnic charges 13'' which are centally suspended within the respective chambers in a similar manner to that described above. Accordingly, each pair of wires exits the housing and is adapted from making contact to the designated camera contacts. In the embodiment depicted in FIGS. 6 and 7, the longitudinal axis 1a—1a passing through the geometric center (in cross-section) of chamber 31'' lies perpendicular to each of the longitudinal axes LA—LA of the respective combustion chambers 17''. The conductive wires supporting charges 13'' are not shown in FIG. 6 for reasons of clarity but are illustrated in FIG. 7.

The pyrotechnic charges as utilized in the present invention are each comprised of a primer composition and a fuel mixture located thereon. Positioning of the charge on the conductive wires is achieved by dipping the ends of both wires within the primer composition in slurry form, withdrawing the composition and permitting it to dry, and thereafter dipping this dried component within the fuel mix in slurry form. The charge is then permitted to dry after which it is positioned within the respective chamber. The initial primer composition may be selected from any of those currently used in the state-of-the-art and adapted for being ignited by pulses as typically produced from piezoelectric or similar elements associated with present day cameras. One suitable example is defined in U.S. Pat. No. 4,059,388 (J. Shaffer), which is assigned to the assignee of the instant invention. Approximately 2.00 mg. of first primer composition is applied to the aligned ends 21 and 21' of the ignition means of the invention. After drying, the coated ends are dipped in the fuel mix which comprises a 57/43 percent (by weight) mix of zirconium and potassium perchlorate. The particle size of the zirconium is approximately 11 microns while that of the perchlorate is about 3 microns. The fuel mixture is dispersed in a nitrocellulose-acetone solution which in turn yields a final percentage of about 0.5% nitrocellulose in the dried fuel. Typical light outputs from each of the charges of the invention range from about 40 lumen seconds to about 100 lumen seconds with peak output occurring between 1 and 5 milliseconds after pulse application, thus rendering the instant invention especially adaptable for cameras which utilize many of todays higher speed films (e.g., ASA 400). Lower outputs are readily possible for even higher speed films. As clearly shown in the drawings (especially in FIGS. 2, 3, 5, 6 and 7), the present invention does not include therein shredded combustible material such as zirconium shreds as the light-producing material. This material is typically required in photoflash lamps of the chemical variety (as mentioned above), a typical example being the lamp described in the aforementioned U.S. Pat. No. 4,059,388.

As stated, the present invention readily lends itself to miniaturization. By way of example, the cylindrical housing depicted in FIG. 1 had an outer diameter of about 4.00 cm. and a thickness of only about 0.50 cm. The housing of device 10' as illustrated in FIGS. 4 and 5, somewhat smaller than that of housing 11 in FIG. 1, possessed an outer diameter of only about 2.50 cm. and a thickness of about 1.50 cm. Housing 11'' for the device illustrated in FIG. 6 or 7 preferably has a height of about 1.50 cm., a length of about 4.50 cm. and a thickness or width of about 0.50 cm.

As also stated, the housings used in the instant invention are plastic, the preferred material being polypropylene. Other materials, such as sytrene and plexiglas can also be used. The conductive wires which comprise the ignition means of the invention are preferably 0.028 cm. diameter copper and have an overall length of only about 1.00 cm. The longitudinal sides (e.g., side 37 in FIG. 3) of the housing of the invention have a thickness of only about 0.08 cm., as stated above. Although the embodiments depicted comprise a total of either 8 or 10 combustion chambers, this number is not meant to limit the scope of the present invention. For example, it is readily possible to produce a device producing a greater or even fewer number of chambers and corresponding charges. One model was produced which contained a total of 20 of each of these components.

Thus there has been shown and described a new and unique photographic flash device which is readily adaptable for utilization within many of today's cameras or future designs thereof. The devices as described are of rigid construction, and are easy and relatively inexpensive to manufacture in comparison to devices employing glass flashlamps.

While there have been shown and described what are at present considered the preferred embodiments of the invention, it will be obvious to those skilled in the art that various changes and modifications may be made therein without departing from the scope of the invention as defined by the appended claims.

What is claimed is:
1. A photographic flash device comprising:
a light-transmitting, insulative housing including a plurality of individual chambers and a common expansion cavity therein, each of said chambers having access to said expansion cavity through an opening therebetween, said expansion cavity substantially larger than each of said chambers;
a plurality of pyrotechnic charges, each of said charges located within a respective one of said chambers within said housing for emitting light through said housing upon ignition thereof, each of said charges exhausting into said expansion cavity through said opening; and
a plurality of electrical ignition means each connected to a respective one of said pyrotechnic charges to permit said charges to be individually flashed.

2. The flash device according to claim 1 wherein the ratio of volumes of each of said individual chambers to said expansion cavity is within the range of about 1:1 to about 1:10.

3. The flash device according to claim 1 wherein said housing is of a substantially cylindrical configuration, said individual chambers arranged in an annular array about the peripheral portion of said housing.

4. The flash device according to claim 3 wherein said expansion cavity is centrally oriented within said housing and is substantially surrounded by said individual chambers.

5. The flash device according to claim 4 wherein said expansion cavity is of a substantially cylindrical configuration, the central axis of said cavity being coincidental to that of said housing.

6. The flash device according to claim 5 wherein each of said chambers is of an elongated configuration and has a longitudinal axis lying substantially perpendicular to the central axis of said cylindrical housing.

7. The flash device according to claim 3 wherein said expansion cavity is of a substantially cylindrical configuration and lies adjacent one of the end surfaces of said cylindrical housing, the central axis of said cavity being coincidental to that of said housing.

8. The flash device according to claim 7 wherein each of said chambers is of an elongated configuration and has a longitudinal axis lying substantially parallel to the central axis of said cylindrical housing.

9. The flash device according to claim 1 wherein said housing is of a substantially boxlike configuration, said chambers oriented within said housing in a substantially linear array.

10. The flash device according to claim 9 wherein said expansion cavity is of an elongated configuration lying adjacent one of the sides of said boxlike housing.

11. The flash device according to claim 10 wherein each of said chambers is of an elongated configuration, the longitudinal axes of said chambers lying substantially perpendicular to the longitudinal axis of said elongated expansion cavity.

12. The flash device according to claim 1 wherein each of said ignition means comprises a pair of electrically conductive wires each having an end portion projecting within a respective one of said chambers, each of said pyrotechnic charges located on said end portions of a respective pair of said conductive wires.

13. The flash device according to claim 12 wherein each of said pyrotechnic charges is substantially centrally oriented within a respective one of said individual chambers and spaced a predetermined distance from the internal surface of the walls of said chamber.

14. The flash device according to claim 1 wherein each of said individual chambers includes a reflective coating located on an internal surface thereof for reflecting light impinging thereon from said pyrotechnic charges through said light-transmitting housing.

15. A photographic flash device having a light-transmitting housing, at least one chamber located within said housing, and at least one pyrotechnic charge for emitting light through said housing upon ignition thereof the improvement wherein said pyrotechnic charge comprises a primer composition and a fuel mixture, said pyrotechnic charge being suspended within said chamber so as to be centrally oriented therein and spaced a predetermined distance from the internal surfaces of the walls of said chamber, said flash device not including shredded combustible material.

16. The improvement according to claim 15 further including means for electrically igniting said pyrotechnic charge, said means comprising a pair of electrically conductive wires each having an end portion projecting within said chamber, said pyrotechnic charge oriented on said end portions of said wires.

17. The improvement according to claim 16 wherein said chamber includes a reflective coating located on an internal surface thereof for reflecting light impinging thereon from said pyrotechnic charge through said light-transmitting housing.

18. The improvement according to claim 15 wherein said fuel mixture of said pyrotechnic charge comprises a mixture of 57 percent by weight zirconium and 43 percent by weight potassium perchlorate.

19. The improvement according to claim 18 wherein the particle size of said zirconium is about 11 microns and the particle size of said potassium perchlorate is about 3 microns.

* * * * *